(12) United States Patent
Attensperger

(10) Patent No.: US 9,273,623 B2
(45) Date of Patent: Mar. 1, 2016

(54) DRIVE SYSTEM FOR AN AUTOMOBILE AND METHOD FOR CONTROLLING A COMBUSTION ENGINE

(75) Inventor: Tobias Attensperger, Garching (DE)

(73) Assignee: AUDI AG, Ingolstadt (DE)

( * ) Notice: Subject to any disclaimer, the term of this patent is extended or adjusted under 35 U.S.C. 154(b) by 922 days.

(21) Appl. No.: 13/478,788

(22) Filed: May 23, 2012

(65) Prior Publication Data

US 2013/0131965 A1  May 23, 2013

(30) Foreign Application Priority Data

May 24, 2011 (DE) .......................... 10 2011 102 427

(51) Int. Cl.
| | |
|---|---|
| *F02D 41/10* | (2006.01) |
| *F02D 41/02* | (2006.01) |
| *F02D 31/00* | (2006.01) |
| *F16H 63/50* | (2006.01) |
| *B60W 10/06* | (2006.01) |
| *F02D 41/04* | (2006.01) |

(Continued)

(52) U.S. Cl.
CPC .............. *F02D 41/10* (2013.01); *B60W 10/06* (2013.01); *F02D 31/001* (2013.01); *F02D 41/022* (2013.01); *F02D 41/023* (2013.01); *F02D 41/04* (2013.01); *F16H 61/0403* (2013.01); *F16H 63/50* (2013.01); *F02D 2200/101* (2013.01); *F02D 2200/501* (2013.01); *F16D 2500/3026* (2013.01); *F16D 2500/30401* (2013.01); *F16H 2059/6807* (2013.01); *F16H 2306/54* (2013.01); *Y10T 477/6418* (2015.01)

(58) Field of Classification Search
CPC ..... F02D 41/10; F02D 41/022; F02D 41/023; F02D 41/04; F02D 31/001; F02D 2200/101; F16H 61/0403; F16H 63/50; F16H 2059/6807; F16H 2306/54; F16D 2500/3026; F16D 2500/30401; F16D 2500/501; Y10T 477/6418
See application file for complete search history.

(56) References Cited

U.S. PATENT DOCUMENTS

| | | | | |
|---|---|---|---|---|
| 5,947,864 | A * | 9/1999 | Ohashi .................. | F16H 61/061 477/154 |
| 6,033,342 | A * | 3/2000 | Steinel .................. | B60W 10/02 477/175 |
| 6,656,090 | B2 * | 12/2003 | Matsumura ........... | B60W 10/02 477/171 |

(Continued)

FOREIGN PATENT DOCUMENTS

| | | |
|---|---|---|
| DE | 101 39 558 A1 | 2/2003 |
| DE | 103 55 186 A1 | 6/2005 |

(Continued)

*Primary Examiner* — Hieu T Vo
*Assistant Examiner* — Sherman Manley
(74) *Attorney, Agent, or Firm* — Henry M. Feiereisen LLC

(57) ABSTRACT

A drive system for an automobile includes a combustion engine, a friction clutch, a multistep gearbox, a controller for controlling the combustion engine based on load lever position, clutch position, gear input shaft rotation speed, gear output shaft rotation speed, engaged gear stage, vehicle speed and/or vehicle acceleration, with a sensor connected with the controller determining a position of the friction clutch. A method for controlling this combustion engine includes the steps of receiving or generating with the controller information about a gear stage change, a clutch position change, a predetermined minimum vehicle speed and-or a predetermined maximum vehicle acceleration, and adjusting the rotation speed of the combustion engine in response to the received or generated information. This approach provides a particularly smooth and comfortable gear stage change.

19 Claims, 2 Drawing Sheets

(51) Int. Cl.
  *F16H 61/04* (2006.01)
  *F16H 59/68* (2006.01)

(56) References Cited

U.S. PATENT DOCUMENTS

| | | | |
|---|---|---|---|
| 7,894,964 B2* | 2/2011 | Murayama et al. | 701/54 |
| 2004/0106498 A1* | 6/2004 | Badillo | B60W 10/11 477/109 |
| 2004/0214687 A1* | 10/2004 | Morisawa | B60W 10/06 477/109 |
| 2008/0255738 A1* | 10/2008 | Murayama | B60W 30/19 701/54 |
| 2008/0255739 A1* | 10/2008 | Murayama | F02D 31/001 701/54 |
| 2009/0326771 A1* | 12/2009 | Murayama | F16H 61/0403 701/54 |
| 2012/0065851 A1* | 3/2012 | Ellis, III | B60W 10/06 701/54 |

FOREIGN PATENT DOCUMENTS

| | | |
|---|---|---|
| DE | 10 2006 028 339 A1 | 2/2008 |
| DE | 10 2007 057 526 A1 | 6/2008 |
| DE | 10 2006 029 044 B4 | 12/2009 |
| EP | 2 017 152 A2 | 1/2009 |
| EP | 2 035 727 B1 | 4/2010 |

* cited by examiner

DRIVE SYSTEM FOR AN AUTOMOBILE AND METHOD FOR CONTROLLING A COMBUSTION ENGINE

CROSS-REFERENCES TO RELATED APPLICATIONS

This application claims the priority of German Patent Application, Serial No. 10 2011 102 427.5, filed May 24, 2011, pursuant to 35 U.S.C. 119(a)-(d), the content of which is incorporated herein by reference in its entirety as if fully set forth herein.

BACKGROUND OF THE INVENTION

The present invention relates to a drive system for an automobile with a friction clutch and a method for controlling the combustion engine of such drive system.

In the following discussion, the term "disengaged" position of the friction clutch is understood as a position where essentially no force is transmitted. The term "engaged" position of the friction coupling refers to a position where substantially the entire force is transmitted. A "multistep gearbox" is a gear train with stages having a fixed gear ratio which can be alternatingly engaged. The parameters which are considered by the controller can be provided to the controller, stored in the controller and/or generated in the controller. A "load lever position" is typically the position of the gas pedal or the position of a twist-grip throttle.

It would be desirable and advantageous to provide an improved drive system with a multi-step gearbox which allows a particularly comfortable and smooth change between gear stages.

SUMMARY OF THE INVENTION

According to one aspect of the present invention, a drive system for an automobile includes a combustion engine, a friction clutch which can be actuated between a disengaged and an engaged position, a multistep gearbox with an input shaft and an output shaft, a controller for controlling the combustion engine by taking into account a load lever position, a clutch position, a gear input shaft rotation speed, a gear output shaft rotation speed, an engaged gear stage, a vehicle speed and/or a vehicle acceleration, and a sensor for determining a disengaged position, an engaged position and intermediate positions of the friction clutch, with the sensor is connected with the controller for signal transmission. Accordingly, information is available to the controller about the actual position of the friction clutch when the friction clutch is disengaged and engaged, even for positions between the engaged and the disengaged position.

According to another aspect of the present invention, a method for controlling the combustion engine of a drive system with a friction clutch, a multistep gearbox and a controller includes the steps of receiving or generating with the controller information about a gear stage change, a clutch position change, a predetermined minimum vehicle speed or a predetermined maximum vehicle acceleration, or a combination thereof, and initiating with the controller an adjustment of a rotation speed of the combustion engine in response to the received or generated information. Adaptation of the rotation speed of the combustion engine can thus be initiated when the friction clutch is actuated during an acceleration or deceleration phase of the automobile and when changing gears of the multistage gearbox.

According to an advantageous feature of the present invention, the friction clutch may have an actuating device and the sensor may be arranged on the actuating device or on the friction clutch. The sensor can thus directly or indirectly determine a position of the friction clutch. The sensor may be arranged at any location of an actuation mechanism between a clutch pedal and a pressure plate. The sensor may thus be arranged at a particularly suitable location of the structure. The sensor may be arranged at a location where the position of the friction clutch can be best determined. The sensor can thus be arranged at a particularly suitable location of the structure. The sensor may be arranged at a location providing a particularly good signal quality.

The sensor may allow a discrete or continuous determination of the position. Sensors with limited resolution may be used with a discrete position determination. With a continuous determination of the position, the clutch position can be precisely determined over the entire clutch travel.

With the method according to the invention, the controller may initiate adaptation of the rotation speed of the combustion engine when the controller receives or generates information about a change in the clutch position in the engagement direction. The rotation speed may thus be adapted, when the clutch is engaged after a change in the gear stages, not only by way of an increasing force transmission of the friction clutch, but also starting already at the combustion engine. This provides a particularly comfortable and pleasant shifting experience for a driver who almost does not notice the support received by the rotation speed adaptation. A rotation speed adaptation which occurs when the driver engages the clutch is hence comfortably amplified.

According to an advantageous feature of the present invention, the controller may initiate an increase in the rotation speed of the combustion engine when the controller receives or generates information about a shift into a lower gear, or may initiate a change in the rotation speed of the combustion engine, when the controller receives or generates information about a shift into a higher gear. "Shift into a lower gear" refers to a shift from one gear stage into a lower gear stage, wherein the rotation speed of the combustion engine is reduced by a lesser amount. "Shift into a higher gear" refers to a shift into a higher gear stage where the rotation speed of the combustion engine is reduced by a greater amount. In this way, a negative acceleration (deceleration) of the vehicle is thus reduced when shifting into a lower gear. The wear on the friction clutch can thus be reduced and its service life extended. Jerking movements during gear shifts can also be reduced, thus enhancing the comfort level.

According to another advantageous feature of the present invention, the rotation speed of the combustion engine may be adapted by initially determining a first target rotation speed of the combustion engine; subsequently a first correction value for the target rotation speed of the combustion engine may be determined; and thereafter a second target rotation speed of the combustion engine may be determined by taking into account the first correction value and the second target rotation speed of the combustion engine. The first correction value may be determined by taking into consideration a vehicle acceleration, in particular a negative vehicle acceleration. This prevents overshoots which could otherwise no longer be reduced.

According to another advantageous feature of the present invention, a third rotation speed of the combustion engine may be determined by taking into account a second correction value and the second rotation speed of the combustion engine. In particular, the second correction value may be a negative offset. This produces a third target rotation speed of the combustion engine which is smaller compared to the second target rotation speed of the combustion engine.

Advantageously, the rotation speed of the combustion engine may be checked for predetermined parameters. The first, second, and/or third rotation speed of the combustion engine may be checked. It can be determined independent of the results of the check, if a rotation speed adaptation of the combustion engine was initiated or not. It can be specified, for example, that the first, the second and/or the third rotation speed of the combustion engine is used for adapting the rotation speed of the combustion engine. Accordingly, predetermined activation conditions may be used.

According to an advantageous feature of the present invention, it may be checked, when the target rotation speed of the combustion engine is smaller than a predetermined maximum rotation speed of the combustion engine and/or if the target rotation speed of the combustion engine is greater than a predetermined minimum rotation speed of the combustion engine, if a predetermined minimum rotation speed difference exists between the target rotation speed of the combustion engine and an actual rotation speed of the combustion engine. This ensures that an intervention for adapting the rotation speed of the combustion engine occurs only when such adaptation is required based on a predetermined minimum rotation speed difference. For example, the predetermined minimum rotation speed difference may be 300-1000 RPM, in particular about 500 RPM. This may also prevent overrevving of the combustion engine which can damage the combustion engine. The combustion engine may also be prevented from stalling.

Advantageously, after a positive check, the rotation speed of the combustion engine may be adapted to the target rotation speed of the combustion engine. If the test result is negative, the target rotation speed of the combustion engine may not be adapted.

In summary, the rotation speed of manual gearboxes may be adapted by increasing the engine rotation speed to reduce/eliminate jerking during shifting by adapting the rotation speed of the engine to the output rotation speed. The rotation speed requirement may be calibrated so that the driver barely notices the rotation speed increase of the engine. The driver may think that the increase in the rotation speed is caused by slippage of the clutch. The rotation speed is also adapted during rapid engagement of the clutch, albeit correspondingly faster. The high rotation speed of the engine is not unnecessarily maintained when the clutch pedal is depressed for long time.

When downshifting has been identified, the rotation speed is brought from the idle rotation speed to the target rotation speed of the actually engaged gear. This occurs depending on the clutch travel (depressed clutch=idle rotation speed, adjustable clutch threshold=target rotation speed of the actually engaged gear). The clutch pedal may include a distance sensor, in particular when engaging the clutch, which allows measurement of the pedal travel. When the clutch is engaged, the target rotation speed may be adapted commensurate with this particular clutch pedal travel sensor.

According to an advantageous feature of the present invention, a gear sensor may be provided for computing the target rotation speed. In addition, a clutch travel sensor is provided. To bring the engine to the output rotation speed, a software solution may be used in the engine controller. The following activation conditions may be used: (down-) shifting detected, clutch travel above a calibrated threshold and speed above a calibrated threshold are prohibited, and the acceleration may not exceed a threshold which can be calibrated.

When these conditions are satisfied, the target rotation speed may be computed from the speed, the wheel circumference and the overall gear ratio. The target rotation speed may then be corrected by the negative acceleration (to prevent overshoots which cannot be reduced further). The target rotation speed may include a negative offset which limits the target rotation speed.

The following checks may be performed with the limited target rotation speed: the rotation speed jump must not be too small, the minimum rotation speed of the engine (minus an offset) should not be exceeded, and the rotation speed should not fall below the idle rotation speed (plus an offset). When all three conditions and the activation condition are satisfied, the clutch can be enabled. This limited target rotation speed is then scaled to the clutch travel (maximum value of the disengage clutch corresponds to 0 RPM requested rotation speed, i.e. idle rotation speed and adjustable threshold of the clutch travel corresponds to the limited target rotation speed). The rotation speed is outputted with an enable bit. The enable bit is set when the aforementioned release conditions are satisfied and the upper and lower thresholds (which have hysteresis) are not exceeded.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
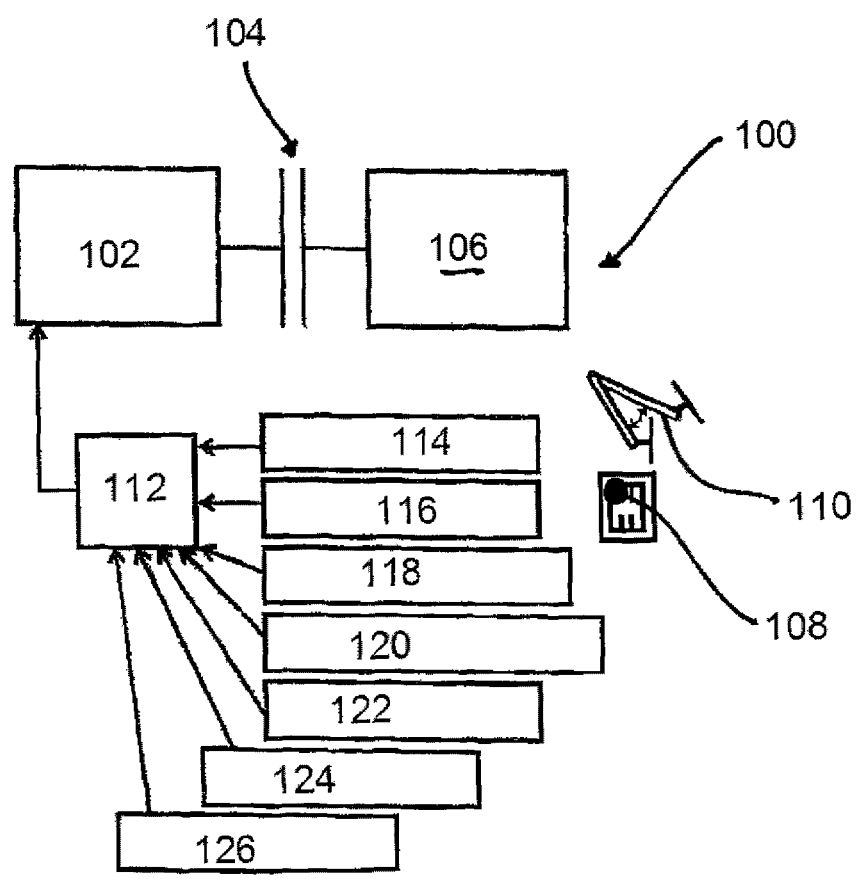
FIG. 1 is a drive system of an automobile with a combustion engine, a friction clutch, a gearbox and a controller according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a drive system 100 of an (otherwise unillustrated) automobile with a combustion engine 102, a friction clutch 104 and a gearbox 106. The combustion engine 102 is used for powering the automobile and has a usable rotation speed range which is limited in relation to the speed range of the automobile. The speed range of the automobile may range from 0 km/h to about 170-250 km/h. The useful rotation speed range of the combustion engine is located approximately between the rotation speed of the maximum torque and the nominal rotation speed with the highest output power. The gearbox 106 is used to convert the rotation speed of the combustion engine to a lower rotation speed. The gearbox 106 is a shiftable multistage gearbox. The gearbox 106 has, for example, six gear stages for travelling forward. Higher gear stages provide a greater gear reduction to a lower rotation speed than lower gear stages. Higher gear stages are intended for a higher speed of travel than lower gear stages. Optionally, a gear stage may also have a gear ratio of 1:1 or a gear ratio for conversion to a higher rotation speed. A gear selection lever 108 is provided for engaging and disengaging gear stages. The friction clutch 104 can be actuated between a disengaged position, in which essentially no force is transmitted, and an engaged position, in which essentially the entire force is transmitted. The friction clutch 104 is used to connect and disconnect the combustion engine 102 and the gearbox 106 with one another for force transmission, allowing start-up and a change of gear stages. In the present example, the friction clutch 104 is operated with a clutch pedal 110, with a kinematic chain being formed from the clutch pedal 110 to the friction clutch 104.

A controller 112 is provided for controlling the combustion engine 102. The rotation speed of the combustion engine 102 can be controlled with the controller 112. Control can occur based on parameters which are provided to the controller 112, which are stored in the controller 112 or which are generated by the controller 112. For example, the controller may be provided with signals from a clutch pedal travel sensor 114, a gear stage sensor 116, a torque 118 desired by a driver, a vehicle speed 120, a brake pedal state 122, a wheel circumference 124 or a temperature 126 of the combustion engine. The signal-conducting links are indicated by arrows.

The clutch pedal travel sensor 114 can be used to determine the extent to which the clutch pedal 110 is actuated. A sensor may be arranged, alternatively or in addition, directly at the friction clutch 104 or at a suitable location on the kinematic chain between the clutch pedal 110 and the friction clutch 104. The clutch pedal travel sensor 114 may be a distance sensor. The clutch pedal travel sensor 114 may be a potentiometer having a resistance value that can be changed mechanically through actuation of the clutch pedal 110. The potentiometer may be an electronic potentiometer, wherein the required electronic components together with a digital control circuit are combined to form an integrated circuit. The potentiometer may also be a wire potentiometer, a helically wound potentiometer, a thin-film potentiometer, a trim potentiometer, a multi-turn potentiometer or a foil potentiometer.

Figure 2:
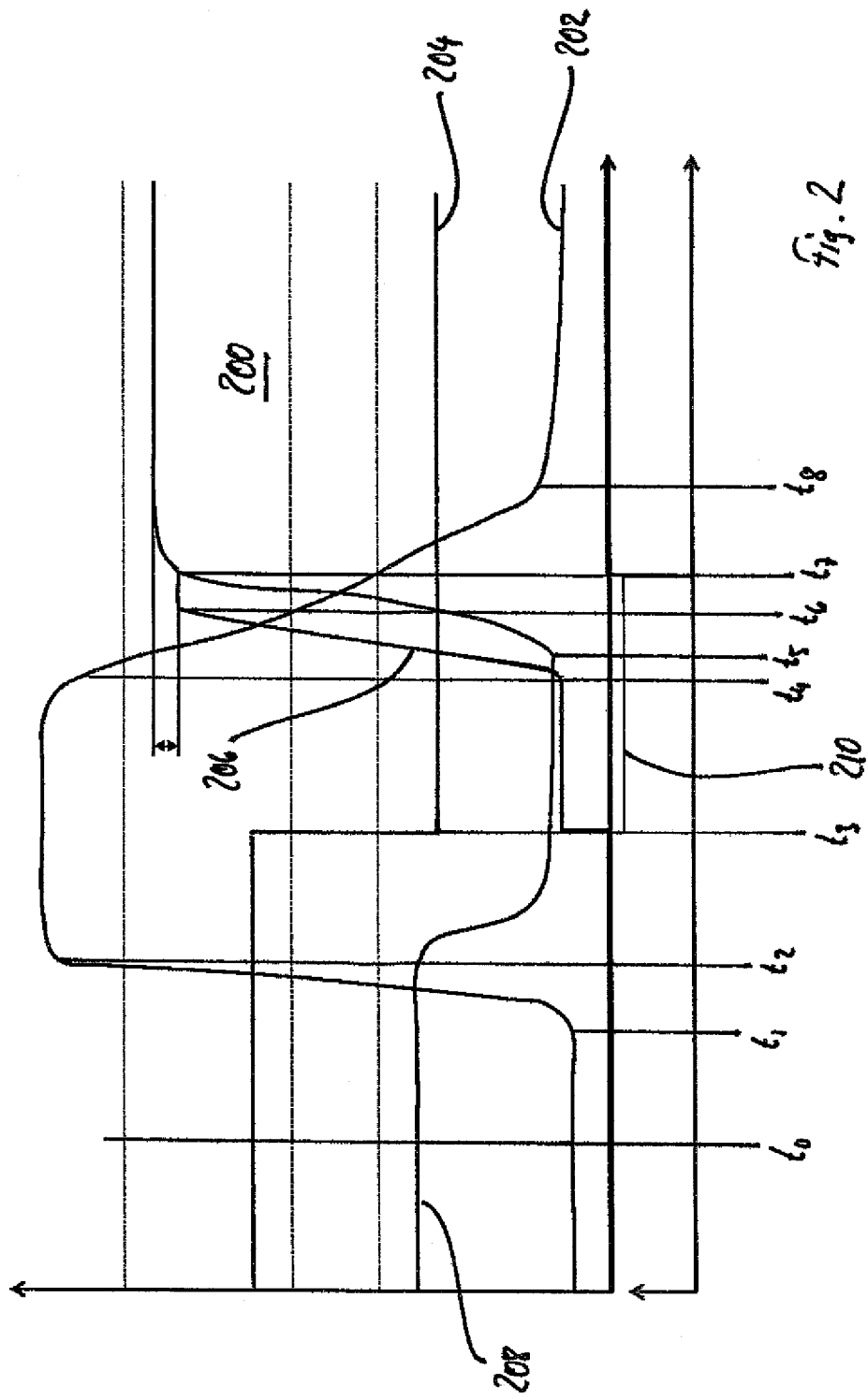
FIG. 2 is a diagram for a shifting operation into a lower gear.

FIG. 2 shows a diagram 200 for switching into a lower gear. The time t is shown on the x-axis of the diagram 200. Illustrated are a clutch travel signal 202, a gear stage signal 204, a target rotation speed signal 206 of the combustion engine, an actual rotation speed signal 208 of the combustion engine, and a release bit signal 210.

The friction clutch begins to disengage at a time $t_1$ following a time $t_0$, when a first gear stage (204) is engaged in a gearbox, a friction clutch (202) is engaged for force transmission between a combustion engine and the gearbox, and the combustion engine rotates with a first actual rotation speed (208) of the combustion engine. The friction clutch is fully disengaged at a time $t_2$. The combustion engine and the gearbox are then completely separated from one another and the actual rotation speed (208) of the combustion engine decreases. At a time $t_3$, a change occurs from the first to a second, lower gear stage (204). Approximately at the same time, a release bit (210) is set so as to adapt with a controller of the combustion engine the actual rotation speed (208) of the combustion engine to the second gear stage.

To aid with the adaptation of the actual rotation speed (208) of the combustion engine, the target rotation speed (206) of the combustion engine is first suddenly adjusted to a predetermined value approximately at the time $t_3$, although the step of suddenly adjusting the target rotation speed of the combustion engine to a predetermined value may optionally be omitted. The target rotation speed (206) of the combustion engine is then computed based on the actual vehicle speed, a wheel circumference and an overall gear ratio. The target rotation speed (206) of the combustion engine may be corrected with a correction value which takes into consideration a negative vehicle acceleration. The friction clutch is engaged beginning at the time $t_4$, followed by an increase in the target rotation speed (206) of the combustion engine, with the actual rotation speed (208) of the combustion engine increasing thereafter starting at the time $t_5$. The target rotation speed (206) reaches a maximum value at the time $t_6$. In the present example, this maximum value is derived from a preliminary maximum target rotation speed of the combustion engine which is reduced by a predetermined value. This reduction is indicated in the figure by a double arrow. At the time $t_7$, the actual rotation speed (208) of the combustion engine has reached the target rotation speed (206) of the combustion engine. The rotation speed of the combustion engine is then no longer guided and the release bit can be reset. The friction clutch (202) is then fully engaged, and the actual rotation speed (208) of the combustion engine now corresponds to that of the second gear stage.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A drive system for an automobile, comprising:
   a combustion engine,
   a friction clutch configured for actuation between a disengaged and an engaged position,
   a multistep gearbox with an input shaft and an output shaft,
   a controller for controlling the combustion engine by taking into account a load lever position, a clutch position, a gear input shaft rotation speed, a gear output shaft rotation speed, an engaged gear stage, a vehicle speed and/or a vehicle acceleration, and
   a sensor for determining a disengaged position, an engaged position and intermediate positions of the friction clutch, wherein the sensor is connected with the controller for signal transmission, said controller being configured to adjust the rotation speed of the combustion engine when a change in the direction of clutch position change toward clutch engagement has occurred.

2. The drive system of claim 1, further comprising a gear stage sensor connected with the controller for signal transmission, said gear stage sensor determining or generating with the controller an engaged gear stage signal, said controller being configured to initiate an adjustment of the rotation speed of the combustion engine based on a change in the determined or generated engaged gear stage signal when a change in the direction of clutch position change toward clutch engagement has occurred.

3. The drive system of claim 2, wherein said controller is configured to 1) determine a first target rotation speed of the combustion engine based on the engaged gear stage signal, 2) determine a first correction value for the first target rotation speed of the combustion engine, 3) determine a second target rotation speed of the combustion engine by taking into account the first correction value and the first target rotation speed of the combustion engine, and 4) adjust the rotation speed of the combustion engine.

4. The drive system of claim 3, wherein the controller is configured to determine the first correction value by taking into account a vehicle acceleration.

5. The drive system of claim 3, wherein the controller is configured to 1) check the difference between the actual rotation speed and at least one of the first and second target rotation speeds of the combustion engine and to 2) adjust the rotation speed of the combustion engine when difference between the target rotation speed the actual rotation speed exceeds a predetermined minimum difference.

6. The drive system of claim 3, wherein the controller is configured to 1) determine when at least one of the first and second target rotation speeds of the combustion engine is smaller than a predetermined maximum rotation speed of the combustion engine or when at least one of the first and second target rotation speeds of the combustion engine is greater than a predetermined minimum rotation speed of the combustion engine, and 2) determine if a magnitude of a difference between the at least one target rotation speed of the combustion engine and an actual rotation speed of the combustion engine is greater than or equal to a predetermined minimum rotation speed difference, and 3) adjust the rotation speed of the combustion engine if the magnitude of a difference between at least one of the first and second target rotation speeds of the combustion engine and the actual rotation speed of the combustion engine is greater than or equal to a predetermined minimum rotation speed difference when the target rotation speed of the combustion engine is between the maximum and minimum rotation speeds of the engine.

7. The drive system of claim 3, wherein the controller is configured to determine a third target rotation speed of the combustion engine by taking into account a second correction value and the second target rotation speed of the combustion engine.

8. The drive system of claim 7, wherein the controller is configured to 1) determine when the third target rotation speed of the combustion engine is smaller than a predetermined maximum rotation speed of the combustion engine or when the third target rotation speed of the combustion engine is greater than a predetermined minimum rotation speed of the combustion engine, 2) determine if a magnitude of a difference between the third target rotation speed of the combustion engine and an actual rotation speed of the combustion engine is greater than or equal to a predetermined minimum rotation speed difference, and 3) adjust the rotation speed of the combustion engine if the magnitude of a difference between the third target rotation speed of the combustion engine and the actual rotation speed of the combustion engine is greater than or equal to a predetermined minimum rotation speed difference when the third target rotation speed of the combustion engine is between the maximum and minimum rotation speeds of the engine.

9. The drive system of claim 7, wherein the controller is configured to 1) check the difference between the actual rotation speed and the third target rotation speed of the combustion engine and to 2) adjust the rotation speed of the combustion engine when the difference between the target rotation speed the actual rotation speed exceeds a predetermined minimum difference.

10. A method for controlling a combustion engine of a drive system with a friction clutch, a multistep gearbox and a controller, comprising the steps of:

receiving or generating with the controller information about a gear stage change, a clutch position change, a predetermined minimum vehicle speed or a predetermined maximum vehicle acceleration, or a combination thereof, and initiating with the controller an adjustment of a rotation speed of the combustion engine in response to the received or generated information that a change in the direction of clutch position change toward clutch engagement has occurred.

11. The method of claim 10, further comprising the steps of:

receiving or generating with the controller information about a shift into a lower engaged gear stage, and initiating with the controller an adjustment of the rotation speed of the combustion engine based on the received or generated shift information when a change in the direction of clutch position change toward clutch engagement has occurred.

12. The method of claim 10, further comprising the steps of:

receiving or generating with the controller information about a shift into a higher engaged gear stage, and initiating with the controller a decrease of the rotation speed of the combustion engine based on the received or generated information about the change in the engaged gear stage when a change in the direction of clutch position change toward clutch engagement has occurred.

13. The method of claim 10, further comprising the steps of:

determining a first target rotation speed of the combustion engine, determining a first correction value for the first target rotation speed of the combustion engine, determining a second target rotation speed of the combustion engine by taking into account the first correction value and the first target rotation speed of the combustion engine, and adjusting the rotation speed of the combustion engine based on the determined first and second target rotation speeds.

14. The method of claim 13, wherein the first correction value is determined by taking into account a vehicle acceleration.

15. The method of claim 13, further comprising the step of checking the difference between the actual rotation speed and at least one of the first and second target rotation speeds of the combustion engine, wherein the controller adjusts rotation speed of the combustion engine when difference between the target rotation speed the actual rotation speed exceeds a predetermined minimum difference.

16. The method of claim 13, and further comprising determining a third target rotation speed of the combustion engine by taking into account a second correction value and the second target rotation speed of the combustion engine.

17. The method of claim 16, further comprising the step of checking the difference between the actual rotation speed and the third target rotation speed of the combustion engine, wherein the controller adjusts rotation speed of the combustion engine when difference between the third target rotation speed the actual rotation speed exceeds a for predetermined minimum difference.

18. A method for controlling a combustion engine of a drive system with a friction clutch, a multistep gearbox and a controller, comprising the steps of:

determining a first target rotation speed of the combustion engine, determining a first correction value for the first target rotation speed of the combustion engine, determining a second target rotation speed of the combustion engine by taking into account the first correction value and the first target rotation speed of the combustion engine, determining when at least one of the first and second target rotation speeds of the combustion engine is smaller than a predetermined maximum rotation speed of the combustion engine or when at least one of the first and second target rotation speeds of the combustion engine is greater than a predetermined minimum rotation speed of the combustion engine, determining if a magnitude of a difference between the at least one target rotation speed of the combustion engine and an actual rotation speed of the combustion engine is greater than or equal to a predetermined minimum rotation speed difference, and adjusting rotation speed of the combustion engine if the magnitude of a difference between at least one of the first and second target rotation speeds of the combustion engine and the actual rotation speed of the combustion engine is greater than or equal to a predetermined minimum rotation speed difference when the target rotation speed of the combustion engine is between the maximum and minimum rotation speeds of the engine.

19. A method for controlling a combustion engine of a drive system with a friction clutch, a multistep gearbox and a controller, comprising the steps of:

determining a first target rotation speed of the combustion engine, determining a first correction value for the first target rotation speed of the combustion engine, determining a second target rotation speed of the combustion engine by taking into account the first correction value and the first target rotation speed of the combustion engine, determining a third target rotation speed of the combustion engine by taking into account a second correction value and the second target rotation speed of the combustion engine, determining when the third target rotation speed of the combustion engine is smaller than a predetermined maximum rotation speed of the combustion engine or when the third target rotation speed of the combustion engine is greater than a predetermined minimum rotation speed of the combustion engine, determining if a magnitude of a difference between the third target rotation speed of the combustion engine and an actual rotation speed of the combustion engine is greater than or equal to a predetermined minimum rotation speed difference, and adjusting rotation speed of the combustion engine if the magnitude of a difference between the third target rotation speed of the combustion engine and the actual rotation speed of the combustion engine is greater than or equal to a predetermined minimum rotation speed difference when the third target rotation speed of the combustion engine is between the maximum and minimum rotation speeds of the engine.

* * * * *